Aug. 26, 1924.
D. C. LAMB
AUTOMOBILE VISOR
Filed Dec. 19, 1922 2 Sheets-Sheet 1
1,506,648
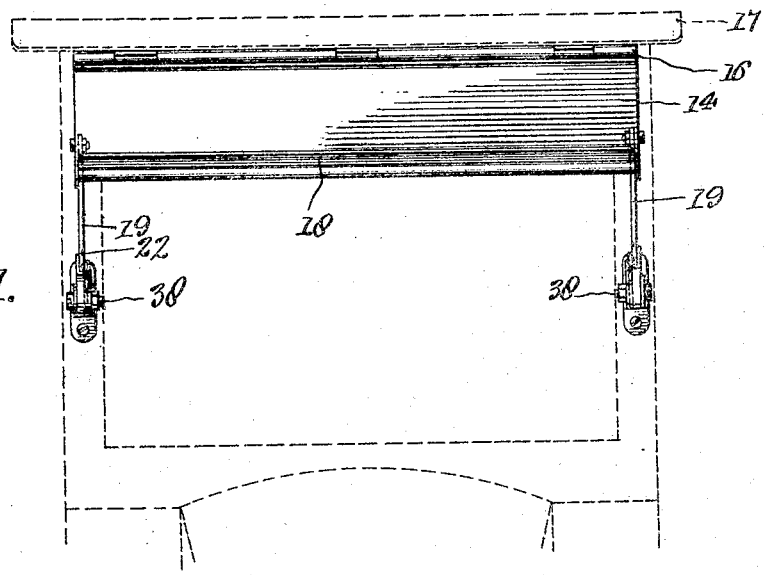
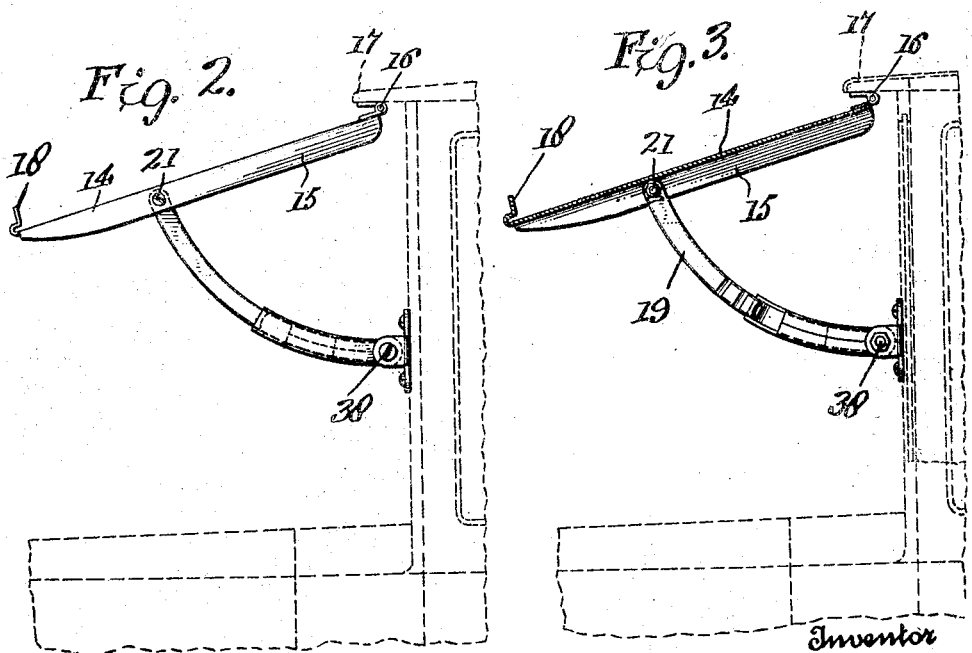
Inventor
David C. Lamb
by Wilkinson & Ginota
Attorneys

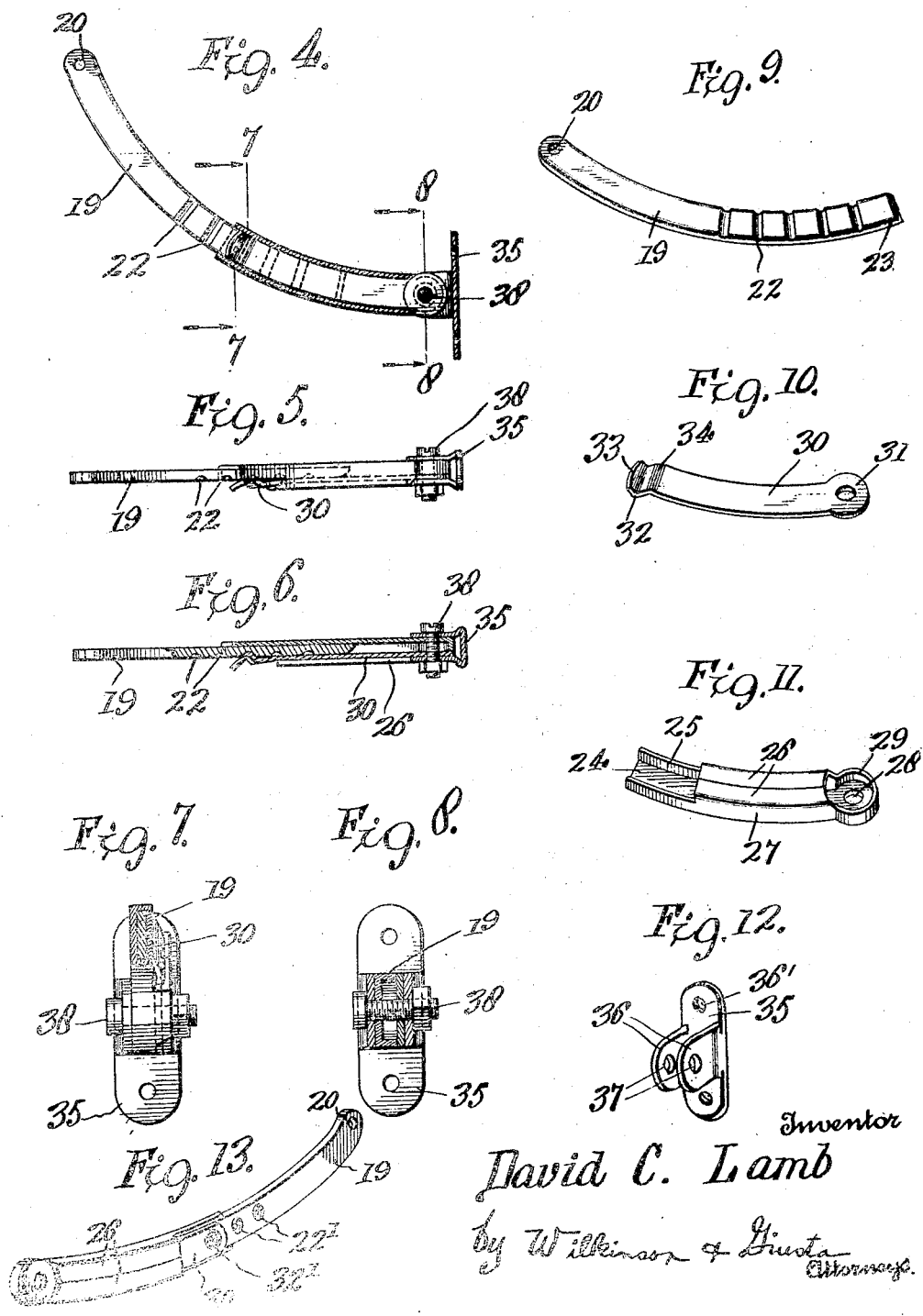

Patented Aug. 26, 1924.

1,506,648

UNITED STATES PATENT OFFICE.

DAVID C. LAMB, OF NAPPANEE, INDIANA.

AUTOMOBILE VISOR.

Application filed December 19, 1922. Serial No. 607,835.

*To all whom it may concern:*

Be it known that I, DAVID C. LAMB, a citizen of the United States, residing at Nappanee, in the county of Elkhart and State of Indiana, have invented certain new and useful Improvements in Automobile Visors, of which the following is a specification.

The present invention relates to improvements in automobile visors and more particularly relates to a shade or awning useful in conjunction with the wind shield to cut off the sun rays from the face and eyes of the driver of the vehicle and generally to shut out glare and to further protect the wind shield glass from deposits of rain, snow and sleet.

It is an object of the invention to accomplish these results by a device that will form an attractive accessory to be purchased independently of the vehicle and attached thereto conveniently without entailing any distortion of the vehicle parts. Of course the device may form an attachment sold with the vehicle itself.

A further object of the invention is to produce such a device simply and compactly involving an adjustable device to permit the shield to assume a variety of angular positions with respect to the plane of the wind shield and to hold the shield in these various angular positions reliably and against the vibration incident to the travel of the vehicle and furthermore without noise or annoyance.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front view of the improved visor with a vehicle designated in dotted lines.

Figure 2 is a side view of the same showing fragments of the vehicle.

Figure 3 also shows a side view of fragments of a vehicle and a vertical section through the visor.

Figure 4 is an enlarged section taken through the visor adjustable support.

Figure 5 is an edge view of the same.

Figure 6 is a transverse section taken through the adjustable support.

Figure 7 is a cross section taken on the line 7—7 in Figure 4.

Figure 8 is a similar section taken on the line 8—8 in Figure 4.

Figure 9 is a perspective view of the slotted bar.

Figure 10 is a similar view of the spring pawl.

Figure 11 is also a perspective view of the socket member.

Figure 12 is likewise a perspective view of a bracket employed, and

Figure 13 is a perspective view showing a slight modification.

Referring more particularly to the drawings 14 designates an opaque and imperforate plate of suitable length and width to extend completely across the wind shield glass and a suitable distance out in front of the body of the vehicle in order to intercept the rays of the sun, rain etc.

The sides of the visor body 14 are flanged an indicated at 15, these flanges being bent downwardly and adapted to support the visor through suitable means hereinafter described so that the visor may occupy a variety of angular positions about the center 16 at which it is hinged to the projecting portion 17 of the vehicle top. The outer free edge of the visor body 14 is rounded and directed upwardly as indicated at 18 for imparting a neat and attractive appearance and to further reinforce and strengthen the metal longitudinally.

To each of the flanges is attached a grooved or arcuate bar 19 such as that shown in Figure 9. This bar is struck upon an arc from the center 16 and is provided at one end with a perforation 20 to receive the bolt or pivot pin which passes through the flange 15 of the visor. On its inner face a series of rounded depressions 22 are provided in spaced relation, the depressions running transversely and being spaced longitudinally and being provided in suitable number to give the device a relatively large range of adjustability. The end opposite to the perforation 20 is beveled as indicated at 23 and this end is slidably received in a socket member such as shown in Figure 11.

The socket member consists of an arcuate or grooved base plate 24 extending upon the same arc with the slotted bar 19 and having at its free end the comparatively shallow flanges 25 extending up at the sides of the bar for guiding it in its telescoping movement. These flanges 25 extend only for a short distance from the free end of the socket member, the remainder of such member being completely closed by the wings 26 which are turned over into parallelism with the base plate 24 and are carried upon relatively deep flanges 27 that form continuations of the shallow flanges 25. The other end of the socket member is perforated as at 28 and is left open having a rim 29 extending thereabout and merging with the flanges 27. The socket member is adapted to hold also, besides the free slotted end of the bar 19, a spring pawl or dog 30 such as shown in Figure 10.

This pawl or dog consists of a thin flat bar of appropriate spring material having the same curvature as the socket member and being received there within and confined by the wings 26 at least as to the major intermediate portion thereof and having the enlarged rounded and perforated end 31 adapted to lie in registry with the perforated end 28 of the socket member, the rounded head portion 31 seating upon the circular rim 29 so as to space the pawl or dog from the base 24 of the socket member, the slotted bar 19 fitting between these two parts and the depressions 22 of the bar admitting the crimped or V-shaped free end portion 32 of the pawl or dog which is guided thereinto by the grooved sides of the V resulting in the formation of a lip 33 at the extremity of the dog and of an inverted complemental V crimping 34 adjacent the portion 32. The portion 34 will spring away from the bar 19 and with the apex of the V 32 resting upon the face of the bar 19, that portion of the pawl extending beyond the wings 26 will be sprung outwardly from the edge of the wings as a center and thus be put in a high state of tension that will result in its prompt reaction wherever one of the depressions 22 is presented. The V character of the pawl and the rounded walls of the notches will cooperate in such a way that the two parts will be held together despite all ordinary vibration of the vehicle but will respond to manual pressure whenever a change in adjustment or angular position of the visor is desired.

The clip or bracket shown in Figure 12 is used to secure the socket member to the vehicle body and comprises a base plate 35 having perforations 36' for the passage of screws or other fastening means by which the clip or bracket is secured for instance to the standards at the sides of the wind shield. The bracket is furthermore comprised of a pair of spaced apart ears 36 extending vertically and having the horizontal perforations 37 for the attachment of the pivot bolt 38 which extends through the perforated head 31 of the pawl or dog 30 and the perforation 28 in the socket member. The slotted rod 19 may be of course separated from the socket member for instance when shipping or packing and in re-assembling the bevel end 23 of the rod will facilitate the prying up of the V-shaped portion 32 of the dog. The V-shaped portion of the dog will also be gripped at the sides by the short or shallow flanges 25 so that the alignment will be preserved but at the same time the flanges are so shallow with reference to the complemental V-shaped portions of the dog that an instrument may be inserted over the flanged edges beneath these portions for the purpose of prying the top out of the locking position.

In Figure 13, is shown a slight modification in which the pawl 30 is provided at its free end with a substantially conical depression 32' forming a tooth on its face adjacent the bar 19, and the latter bar 19, instead of having the slots, is formed with conical or rounded depressions 22' at suitable intervals to receive the conical tooth.

It will be appreciated that the device may be manufactured economically and may form an attractive accessory to be purchased at reasonable cost and it will be further understood that the attachment will be simple and involve little expense and that the device generally will form a convenient inexpensive and efficient means for both protecting the wind shield and shielding the driver from general glare and from the direct rays of the sun when low.

It is obvious that various changes and modifications may be made in the details of construction and design of the above specifically described embodiment of this invention without departing from the spirit thereof, such changes and modifications being restricted only by the scope of the following claims.

What is claimed is:

1. An adjustable support for vehicle visors and the like comprising an elongated channel member, an elongated latch having a latch nose provided with an outer flaring part, means for securing said latch member to the channel member at the end opposite the nose, said channel member being constructed to confine the latch member except at the outer end thereof, and a bar engageable with the flaring nose of the latch member to pry said member away from the channel member whereby to permit insertion of the bar adjustably between the channel member and latch, said latch adapted to cooperate with said bar to hold it in adjusted position.

2. A support for vehicle visors and the like comprising an elongated curved closed channel member secured at one end, a curved flat bar struck on the same arc as said channel member and slidably fitted therein with notches on one flat side of said bar, said bar being removable from the channel member, and an elongated latch carried in said closed channel member and having one free end projecting therebeyond to move toward and from said bar, said latch being provided with a latch nose adapted to fit into the notches of said bar.

3. An automobile visor comprising a shield member hinged to the vehicle, and adjustable supports for the shield member composed each of a socket member having a channel with shallow flanges at the free end of the socket member and wings enclosing the channel adjacent the other end, a rimmed head adjacent the wings, a latch having a shank passing through the channel and confined by the wings and provided with a head resting on the rimmed portion of the first head, means passing through both heads to secure the socket member pivotally to the vehicle, and a notched bar received in the channel and being pivoted to the shield member, said notches in the bar adapted to be engaged by the latch alongside the shallow flanges.

DAVID C. LAMB.